United States Patent [19]

Bonnetain

[11] 4,221,413
[45] Sep. 9, 1980

[54] SHOCK ABSORPTION BUMPER FOR AN AUTOMOTIVE VEHICLE

[76] Inventor: Yves Bonnetain, 28 Rue Laurent Carle, Lyons 8° (Rhone), France

[21] Appl. No.: 882,194

[22] Filed: Feb. 28, 1978

Related U.S. Application Data

[63] Continuation of Ser. No. 699,009, Jul. 2, 1976, abandoned.

[51] Int. Cl.$^2$ ............... B60R 19/04; B61F 19/04
[52] U.S. Cl. ........................... 293/122; 188/1 C; 293/135
[58] Field of Search .............. 293/60, 70, 73, 89, 293/DIG. 3, 87, 97, 64, 84, 86, 71 R, 98, 102, 107–110, 120–122, 132–137; 188/1 C; 267/139

[56] References Cited

U.S. PATENT DOCUMENTS

| | | | |
|---|---|---|---|
| 3,241,875 | 3/1966 | Staniland et al. | 293/87 X |
| 3,444,962 | 5/1969 | Lech | 188/1 C |
| 3,506,295 | 4/1970 | Yancey | 293/87 X |
| 3,744,835 | 7/1973 | Carbone et al. | 188/1 C X |
| 3,857,595 | 12/1974 | Plegat | 293/86 X |
| 3,888,531 | 6/1975 | Straza et al. | 293/60 X |
| 3,930,665 | 1/1976 | Ikawa | 293/71 R X |

Primary Examiner—Douglas C. Butler
Attorney, Agent, or Firm—Remy J. VanOphem

[57] ABSTRACT

An improved energy absorption device of the type incorporating a core member having layered arcuate bands each formed of a corrugated configuration with apices. Each corrugated layer within the core member is stacked in contact with each other having the adjoining arcuate bands overlaying in abutting relationship and joined to each other. The core member is mounted to a support member. A deformable outer body enclosure surrounds the support member and the plurality of the corrugated arcuate bands so that when a force strikes the shock absorption bumper, the apices of the layered bands permanently deform by concurrent flattening of the arcuate bands in engagement with each other. The plurality of corrugated bands thereby concurrently resist and absorb the striking force.

9 Claims, 6 Drawing Figures

SHOCK ABSORPTION BUMPER FOR AN AUTOMOTIVE VEHICLE

This is a continuation of application Ser. No. 699,009, filed July 2, 1976 and now abandoned.

BACKGROUND OF THE INVENTION

The present invention concerns an energy-absorption device, principally for vehicles.

It is known that when a light vehicle comes into collision with an obstacle, the shock imposed on the occupants is due to the rapid deceleration of the vehicle. This deceleration is accompanied by a deformation of the car, and a deformation of the obstacle, corresponding to the absorption of the kinetic energy of the car. The deformations have the advantage of reducing the violence of the shock by diminishing the maximum value of the deceleration, but the deformations of the car are dangerous for the passengers. It is desirable, therefore, to obtain deformation of the obstacle.

One of the most dangerous obstacles is the heavy goods vehicle, for it is on the road itself and has a large mass. For this purpose, it is known for the rear of heavy goods vehicles to be fitted with a bumper designed to stop vehicles becoming embedded underneath them, for the rear is the part of them most exposed to being struck by cars. This bumper must be able, in case of collision, to deform sufficiently to absorb the maximum energy. However it must be fixed very solidly and be sufficiently resistant to collisions in order to tolerate large impacts in case other parts of the two vehicles come into contact, for example the windscreen area of the car with the rear of the goods vehicle.

SUMMARY OF THE INVENTION

The present invention has the aim of providing an energy absorption device more resistant than the traditional rear bumpers, but capable of absorbing more energy whatever may be the relative directions of the trajectories of the vehicles before the collision.

An energy absorption device according to the invention, principally intended to be mounted as a bumper on a heavy goods vehicle is characterised in that it comprises a core constituted by a plurality of superimposed corrugated bands being configured with arserte apices, two adjacent bands being arranged in such a way that the arcuate apices of the corrugations butt against each other, so that a collision between two vehicles situated one on each side of the device is absorbed by a concurrent flattening of the arcuate apices of the corrugations.

According to an additional characteristic of the invention, the corrugated bands are stacked in such a way that two adjacent bands have their corrugations running at right angles.

According to a variant of the invention, the corrugated bands are stacked in such a way that two adjacent bands have their corrugations running at any angle between 0° and 90°.

According to an additional variant of the invention the bands all have corrugations at the same spacing, and they are stacked in such a way that two adjacent bands have their corrugations parallel, and defining a series of long parallel cavities.

According to an additional characteristic of the invention, all the bands are in the same material and are of the same thickness with corrugations of the same shape.

According to a variant of the invention, the bands are chosen so that their rigidity differs and increases from the external face to the internal face of the core.

According to an additional characteristic of the invention, the bands are assembled to each other by screwing or riveting.

According to a variant of the invention, the bands are assembled to each other by welding or sticking.

According to an additional characteristic of the invention, the internal face of the core is fixed to a rigid flat support capable of little deformation.

According to an additional characteristic of the invention, the core of the device is laterally inset against a rigid beam, such as an "I" beam, so that its internal face rests against the web of the "I", while the whole is entirely enclosed in a light deformable body.

BRIEF DESCRIPTION OF THE DRAWINGS

The attached drawings, given by way of non-limiting example, will allow the characteristics of the invention to be better understood.

DETAILED DESCRIPTION OF THE PREFERRED EMBODIMENT

Figure 5:
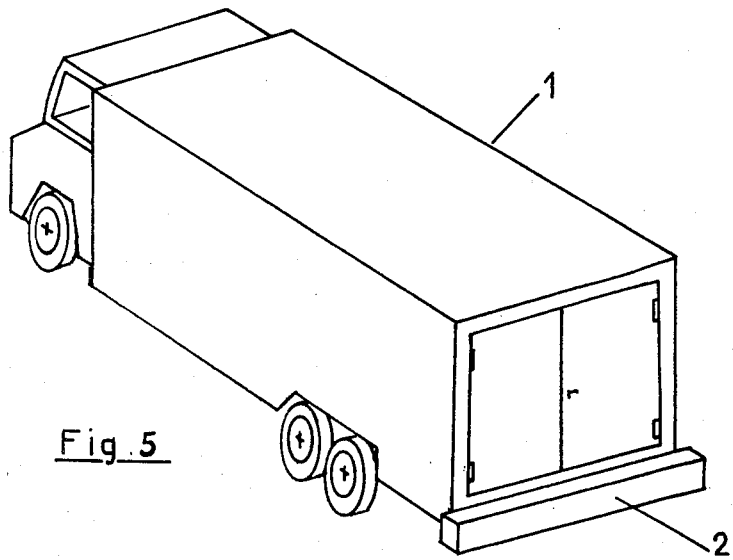
FIG. 5 is a perspective view of a van fitted with an energy absorption device according to the invention.

The van 1 shown in FIG. 5 carries a rear bumper constituted by an energy-absorption device 2 according to the invention. This device 2 presents the external appearance of a parallelepiped of which the greatest dimension lies transversely to the central longitudinal plane of the vehicle.

Figure 1:
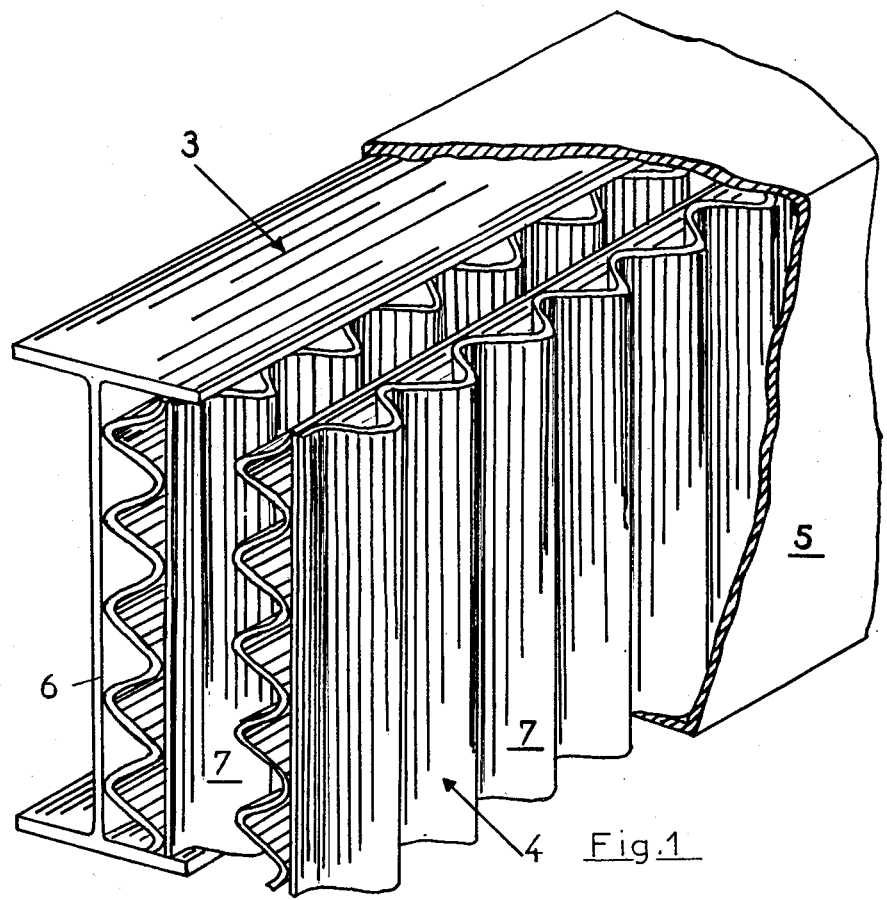
FIG. 1 is a part view in perspective of the energy-absorption device.

The devide 2 as shown in FIG. 1, comprises a support 3, a core 4 and an outer body 5.

The support 3 is a beam such as an "I" beam, arranged with its web 6 vertical, and fixed very solidly to the chassis of the van 1. This support 3 is a rigid part, therefore is not intended to undergo deformation in case of a collision.

The core 4 of which the internal part is inset into the support 3, is constituted by a plurality of superimposed corrugated bands 7 each corrugation being configured with arcuate rounded apices stacked in such a way that the arcuate apices of the corrugations of two adjacent bands abut and may be oriented with respect to each other at right angles. The bands 7 are attached to one another by sticking or welding to thereby form a stacked tier. They may equally be riveted or screwed. These bands may in addition be made from rigid or semi-rigid material such as steel, aluminium, plastic material etc.

Figure 6:
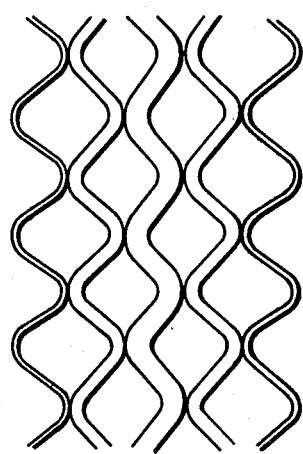
FIG. 6 is an end view of a tier of bands of increasing thickness from the periphery to the core of the tier.

The material may likewise vary from one band to another, and bands may be arranged with their thickness increasing from the external face to the internal face of the core. FIG. 6 shows a tier where the bands are arranged with their thickness increasing from the faces to the center of the core.

The operation is as follows:

When a shock occurs at the rear of the van, as the result of a collision, for example by a car striking the van, the device 2 absorbs energy by deforming between the two vehicles like a spring. However, contrary to the latter, it does not store or restitute this energy after compression; its deformations are permanent. In addition its deformations may be localized or different if the structure of the striking vehicle is not of homogeneous stiffness.

The body 5 constitutes only a simple deformable exterior protection. It is, for example, made from metal or plastics.

Figure 2:
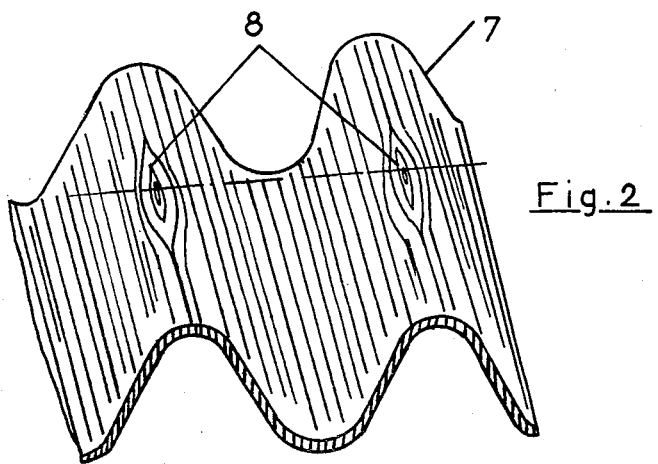
FIG. 2 is a part view in perspective of a corrugated band.

There is shown in FIG. 2 one of the bands 7 of the core 4 of FIG. 1 after a shock. The areas of contact 8 with the adjacent band are limited by circles and result from a partial flattening of the joined arcuate apices of the corrugations. Throughout the duration of the shock the diameter of the circles increases to thereby be deformable under compressive loading.

Figure 3:
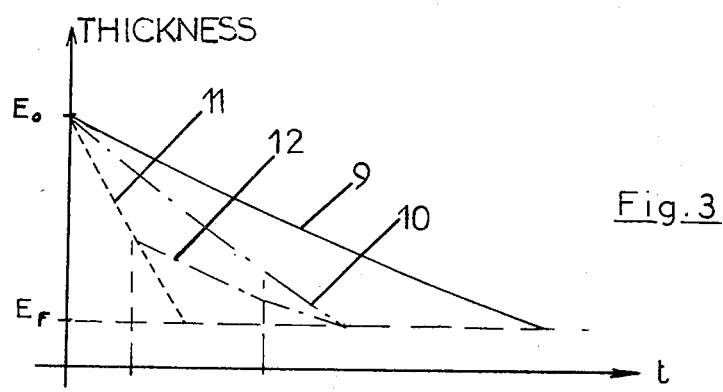
FIG. 3 is a diagram illustrating the operation.

The diagram of FIG. 3 represents for three different structures as a function of time, the variations in thickness of the core during a shock. The curves 9, 10 and 11 represent the crushing of the core in relation to time for a given shock, that is to say for the same mass moving at the same speed. In all cases the thickness varies between the values $E_o$ and $E_f$, the degree of crushing being $E_o-E_f$, but the curves are at different slopes. This slope characterizes the "shock absorbing ability" of the device. The shock-absorbing ability may be chosen by varying:

the nature of the materials used for the manufacture of the core, the thickness of these materials, the form and the dimensions of the corrugations, the number of alternated bands.

Likewise materials of different rigidity may be used, or bands of different thicknesses arranged in the same core. There will then be obtained a composite curve 12 with angular points corresponding to the successive deformations of the different bands.

Figure 4:
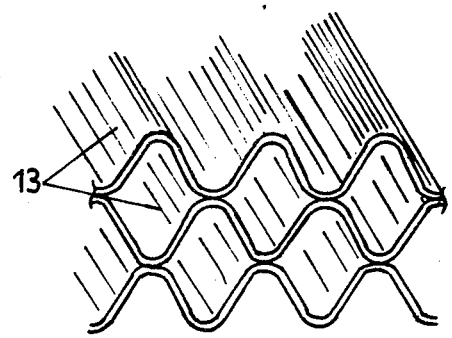
FIG. 4 is a perspective view of the core according to the invention.

According to a variant of the invention, there is shown in FIG. 4 a core constituted by the juxtaposition of corrugated bands 13 of which the corrugations are at the same spacing. Their arrangement is such that the projecting parts of the corrugations of two adjacent bands butt against one another, thus delimiting between these two bands a series of elongated parallel cavities, giving the core a honeycomb structure.

In this case, when a shock occurs, the areas of contact are no longer circular surfaces, but rectangular surfaces 14 as shown in FIG. 5. During the shock, the rectangles are of constant length and increasing width (FIG. 5).

The principal advantage of the energy-absorption device according to the invention is to be resistant while absorbing a large amount of energy whenever shock occurs, whatever are the relative directions of the trajectories of the vehicles before the shock.

The scope of the invention will not be exceeded by using a core of which the bands have their corrugations set at any angle between 0° and 90°.

Having described my invention, it will be apparent to those skilled in the art to vary the design and features of the invention without departing from the scope of the invention or the claims therefor.

Therefore, what I claim is:

1. A bumper for a heavy goods vehicle comprising:
    a support member;
    a core member comprising a plurality of arcuate bands mounted to said support member, each of said plurality of arcuate bands having a corrugated configuration, said corrugated configuration forming troughs and ridges with symmetrical offset apices, said apices in each band defining axis of orientation parallel therebetween, said arcuate bands being stacked in direct contact with each other with the apices of said corrugated configuration of adjacent arcuate bands overlaying each other in abutting relationship so as to form spaces between adjacent bands;
    means joining said abutting apices to each other, said plurality of arcuate bands thereby formed into a tier, said tier being concurrently deformable under compressive loading by flattening of said corrugated configuration of said plurality of arcuate bands;
    means for mounting at least one of said plurality of arcuate bands to said support member; and
    a deformable outer body enclosure means entirely surrounding said support member and said tier, said outer body enclosure means being in contact with said support member and at least one of said plurality of arcuate bands so that when a force strikes said enclosure means, said arcuate bands permanently deform by concurrent mutual flattening of the apices, thereby resisting the striking force and absorbing said force.

2. A bumper as claimed in claim 1 wherein said apices of the plurality of arcuate bands overlaying each other in abutting relationship extend with their respective axes of orientation at an angle to each other.

3. A bumper as claimed in claim 2 wherein the respective axes of orientation of the apices of alternate arcuate bands are at right angles with the respective axes of orientation of said apices of abutting bands.

4. A bumper as claimed in claim 1 wherein each of said arcuate bands comprising said tier is of equal thickness.

5. A bumper as claimed in claim 1 wherein said arcuate tier comprises bands of increasing thickness from the exterior periphery to the inner core of said tier.

6. A bumper as claimed in claim 1 wherein, said support member has an "I" beam configuration.

7. An absorption device comprising:
    a core member comprising a plurality of arcuate bands, each band having a corrugated configuration, said corrugated configuration forming troughs and ridges with symmetrical apices, said apices in an arcuate band defining axes of orientation parallel therebetween, said arcuate bands being stacked in direct contact with each other with the apices of said corrugated configurations of adjacent bands overlaying each other in abutting relationship and extending with their respective axes of orientation at an angle to each other, said plurality of arcuate bands being concurrently deformable under compressive loading by flattening of said apices; and
    a deformable outer body enclosure means entirely surrounding said plurality of arcuate bands, said deformable outer body enclosure means being in direct contact with at least one of said plurality of arcuate bands so that when a force sufficient to deform said outer body enclosure means strikes said enclosure means, the like apices of the plurality of arcuate bands permanently deform by concurrent mutual flattening, thereby resisting the striking force and absorbing said force.

8. A bumper for a heavy goods vehicle comprising:

a support member;

a core member comprising a plurality of arcuate bands mounted to said support member, each of said plurality of bands having a corrugated configuration, said corrugated configuration forming troughs and ridges with symmetrical apices, said apices in a band defining axes of orientation parallel therebetween, said band being stacked in contact with each other with the apices of said corrugated configuration of adjacent bands overlaying in abutting relationship; means joining said abutting apices to each other, said plurality of arcuate bands thereby formed into a stacked tier, said arcuate bands varying in rigidity from the band adjacent the support member to the outermost band, said arcuate bands being concurrently deformable under compressive loading by successive flattening of said joined apices;

means for mounting at least one of said plurality of arcuate bands to said support member; and a deformable outer body enclosure means entirely surrounding said support member and said bands, said outer body enclosure means being in contact with said support member and at least one of said plurality of bands so that when a force strikes said enclosure means, the apices of the plurality of bands permanently deform by concurrent flattening of the apices, thereby resisting the striking force and absorbing said force.

9. A bumper as claimed in claim 8 wherein, said support member is an "I" beam having a web portion and parallel transverse portions defining the ends of said web portion, and said core member rests against the web portion of said "I" beam member interposed said parallel transverse portions defining the ends of said web portion.

* * * * *

UNITED STATES PATENT OFFICE
CERTIFICATE OF CORRECTION

Patent No. 4,221,413  Dated September 9, 1980

Inventor(s) Yves Bonnetain

It is certified that error appears in the above-identified patent and that said Letters Patent are hereby corrected as shown below:

Column 1, line 9, delete the word "energy-absorption" and insert ----energy absorption----.

Column 1, line 47, delete the word "arserte" and insert ----arcuate----.

Column 2, line 43, delete the word "devide" and insert ----device----.

Column 2, line 53, delete the word "rounded".

Signed and Sealed this

Third Day of February 1981

[SEAL]

Attest:

RENE D. TEGTMEYER

Attesting Officer  Acting Commissioner of Patents and Trademarks